United States Patent
Sears et al.

(10) Patent No.: US 6,270,883 B1
(45) Date of Patent: Aug. 7, 2001

(54) COMPOSITES CONTAINING CELLULOSIC PULP FIBERS AND METHODS OF MAKING AND USING THE SAME

(75) Inventors: Karl D. Sears, Jesup, GA (US); Rodney E. Jacobson; Daniel F. Caulfield, both of Madison, WI (US); John Underwood, St. Simon's Island, GA (US)

(73) Assignees: The United States of America as represented by the Secretary of Agriculture, Washington, DC (US); Rayonier Inc., Stamford, CT (US)

( * ) Notice: Subject to any disclaimer, the term of this patent is extended or adjusted under 35 U.S.C. 154(b) by 0 days.

(21) Appl. No.: 09/169,663

(22) Filed: Oct. 9, 1998

(51) Int. Cl.[7] .............................. C08L 9/00; C08L 23/00
(52) U.S. Cl. .................................. 428/292.1; 428/297.4; 428/300.1; 428/364

(58) Field of Search .............................. 428/292.1, 297.4, 428/300.1, 364

(56) References Cited

U.S. PATENT DOCUMENTS 4,131,577 * 12/1978 Lachowicz .

* cited by examiner

Primary Examiner—Richard Weisberger
(74) Attorney, Agent, or Firm—Kramer Levin Naftalis & Frankel LLP

(57) ABSTRACT

Reinforced composites containing cellulosic pulp fibers dispersed in a matrix, wherein the matrix comprises a thermoplastic polymeric material melting above 180° C. and the cellulosic pulp fibers have an alpha-cellulose purity greater than 80% by weight. Methods of making and using the reinforced composites.

44 Claims, No Drawings

US 6,270,883 B1

COMPOSITES CONTAINING CELLULOSIC PULP FIBERS AND METHODS OF MAKING AND USING THE SAME

BACKGROUND OF THE INVENTION

1. Field of the Invention

This invention relates to improved composite materials containing cellulosic pulp fibers dispersed in a polymeric matrix material. The invention also relates to melt-blending and extrusion methods of making these composites and methods of using the same in injection molding applications.

2. Description of the Related Art

Several publications are referenced in this application. These references describe the state of the art to which this invention pertains, and are incorporated herein by reference.

In the plastics industry, fillers and reinforcement materials are typically used to improve the properties of plastics. The addition of such materials can improve properties such as conductivity, strength, modulus values, notched impact resistance, etc.

Glass fibers are the most used reinforcement material for thermosets and thermoplastics. Glass fibers impart high strength, dimensional stability, and heat resistance to a plastic composite. Although glass fibers achieve desirable reinforcing properties, glass fibers are costly, abrade processing equipment and increase the density of the plastic systems. In certain applications, these disadvantages outweigh the advantages of using glass fibers as a reinforcement additive.

Cellulosic pulp materials have been evaluated as fillers for plastics in the past. Klason, et al., "Cellulosic Fillers for Thermoplastics", *Polymer Composites*, (1986); Klason, et al., "The Efficiency of Cellulosic Fillers in Common Thermoplastics. Part 1. Filling without processing aids or coupling agents", *Intern. J. Polymeric Mater.*, Volume 10, pgs. 159–187 (1984); Snijder, et al., "Polyolefins and Engineering Plastics Reinforced with Annual Plant Fibers", *The Fourth International Conference on Wood Fiber-Plastic Composites*, pg. 181–191.

Cellulosic pulp materials have relatively low densities (approximately 1500 kg/m$^3$) and result in reduced wear on the processing equipment compared to glass and mineral materials [e.g., the density of wollastonite, a mineral fiber, is 2900 kg/m$^3$; the density of E(electrical) glass fiber is 2500 kg/m$^3$]. However, prior investigations of the use of wood cellulosic pulps or raw lignocellulosic resources (e.g., wood flour, bagasse) in polymeric materials such as thermoplastics found that a pronounced discoloration of the composite material occurred with the use of these materials at temperatures above 200° C. Furthermore, the use of such pulps were found to cause significant off-gasing and disadvantageous odors, principally due to impurities such as lignin. Moreover, previous studies have also found that at temperatures above 200° C. the cellulosic fibers themselves had poor reinforcing properties compared even to ground wood and cellulose flours [Klason, et al., *Intern. J. Polymeric Mater.*, Volume 10, p. 175 (1984)]. These disadvantageous results directed previous research efforts to the use of cellulosic materials in polymers having melting temperatures below 200° C.such as polypropylene and polyethylene (melting temperatures below 180° C.), and away from higher melting temperature materials.

It would be desirable to provide an improved reinforcement filler for use in polymeric materials such as thermoplastics where the filler has a lower cost, lower density, increased reinforcing characteristics, reduced abrasiveness, and the ability to be processed at high temperatures (e.g., above 200° C.).

OBJECTS OF THE INVENTION

It is an object of the invention to overcome the above-identified deficiencies.

It is another object of the invention to provide an improved composite containing cellulosic pulp materials and methods of making and using the same.

It is a further object of the invention to provide improved composites containing cellulosic pulp materials having reduced discoloration and lower densities.

It is a still further object of the invention to provide extrusion/injection molded products made from the improved composites and methods of making and using the same.

The foregoing and other objects and advantages of the invention will be set forth in or are apparent from the following description.

SUMMARY OF THE INVENTION

The inventors of the present application have surprisingly and unexpectedly discovered improved composite materials containing a cellulosic pulp as a reinforcing material. The cellulosic pulp fibers used according to the invention have an alpha-cellulose purity greater than 80% by weight. The use of such cellulosic pulp materials not only provides improved structural characteristics to the composite at a reduced cost and with only a modest increase in the density of the plastic system, but also do not significantly abrade the processing equipment, generate malodors, or result in unacceptable discoloration of the composite. Additionally, the use of the cellulosic pulp materials according to the invention allows for the blending of the components and shaping of the resultant composite material at lower processing temperatures. Surprisingly, the composite materials may be injection molded using processing temperatures below those used with conventional composites, even below the melting point of the polymeric matrix material itself.

DESCRIPTION OF THE PREFERRED EMBODIMENTS

One aspect of the invention relates to improved composites containing cellulosic pulp fibers dispersed in a matrix, wherein the matrix comprises a polymeric material and said cellulosic pulp fibers have an alpha-cellulose purity greater than 80% by weight. Preferably, the composite comprises greater than 1% and less than 60% by weight cellulosic pulp fibers, more preferably less than 50% by weight cellulosic pulp fibers, even more preferably, less than 40% by weight and most preferred around 30% or less by weight. Preferably, the fibers are substantially dispersed throughout the composite.

According to one embodiment, the cellulosic pulp fibers have an alpha-cellulose purity greater than 90% by weight, preferably greater than 95% by weight, more preferably greater than 96% by weight, even more preferably greater than 98%.

According to another embodiment, the cellulosic pulp fibers have a lignin content less than 2% by weight, preferably less than 1% by weight, more preferably less than 0.5% by weight.

Suitable purified cellulosic pulps include Ultranier-J, Rayfloc-J-LD, Porosanier-J-HP, Ethenier-F-UHV, Sulfatate- H-J-HD and Placetate-F, each of which are available from Rayonier, Specialty Pulp Products (Jesup, Ga. and Fernandina Beach, Fla.). All of these pulps have an alpha-cellulose purity of 95% or greater with the exception of Rayfloc-J (about 86% alpha-cellulose content). All are softwood pulps with the exception of Sulfatate-H-J which is manufactured from hardwood fibers. The Placetate and Ethenier grades are sulfite pulps whereas the others are kraft pulps. Such pulps are readily available commercially. Other suitable cellulosic pulp materials from other manufacturers include Estercell and Viscocell (International Paper—Natchez, Miss.), Supersoft (International Paper—Texarkana, Tex.), Borregaard UHV-S (Borregaard, Sarpsborg, Norway), Saiccor Acetate and Saiccor Viscose (Saiccor-Umkomass, South Africa), Weyerhaeuser MAC II (Weyerhaeuser, Cosmopolis, Wash.), Buckeye A-5 and Buckeye Cotton Linters (Buckeye Technologies—Perry, Fla. and Memphis, Tenn., respectively).

The cellulosic pulp fibers may be derived from a softwood pulp source with starting materials such as various pines (Southern pine, White pine, Caribbean pine), Western hemlock, various spruces, (e.g., Sitka Spruce), Douglas fir or mixtures of same and/or from a hardwood pulp source with starting materials such as gum, maple, oak, eucalyptus, poplar, beech, or aspen or mixtures thereof.

Commercial pulps are typically available in sheet form. In order to facilitate the blending of the fibers with the polymeric material, the fiber sheets may be broken down to individual fibers or small aggregates of fibers. According to one embodiment, the cellulosic pulp fibers are granulated so that the fibers can be readily dispersed in the polymeric matrix. The step of granulating may be performed using a rotary knife cutter to break up the pulp material. The granulation process, however, also reduces the length of the fibers. A reduction in fiber length typically decreases the reinforcing impact of a fiber additive. The granulated cellulosic fibers typically have an average length between 0.1 and 6 mm.

According to another embodiment, the cellulosic pulp fibers are pelletized to form pellets of fibers without granulating the fibers since the step of granulating the cellulose fibers prior to blending with the polymeric material decreases fiber length. Replacing the granulating step with the use of pelletized fibers preserves the fiber length to a much greater extent, and also allows for adequate feeding and mixing of the fibers with the polymer. With greater fiber length retention, the tensile strength and unnotched Izod impact properties of the composites are substantially enhanced. The fibers in pelletized form are mixed with the polymeric matrix material and fed to the extruder. During melt blending, the pellets break down allowing the individual fibers to be readily dispersed throughout the matrix. Advantageously, the pelletizing of the fibers does not significantly decrease the fiber length which increases the reinforcing properties of the fibers.

The fiber length may also be reduced during the blending operation. Accordingly, one preferred embodiment involves introducing the pellets at a later stage of the blending process. For example, the fibers may be introduced at one of the latter zones of a twin screw extruder to enable sufficient blending with the polymer without a significant reduction in fiber length.

The matrix material of the composite comprises a polymeric material melting preferably between 180–270° C. Suitable polymeric materials include polyamides, PET (polyethylene terephthalate), PBT (polybutylene terephthalate), or mixtures thereof. Other suitable materials include PTT (polytrimethylterephthalate), ECM (ethylene-carbon monoxide) and styrene copolymer blends such as styrene/acrylonitrile (SAN) and styrene/maleic anhydride (SMA) thermoplastic polymers. Still further materials include polyacetals, cellulose butyrate, ABS (acrylonitrile-butadiene-styrene), certain methyl methacrylates, and polychlorotrifluoroethylene polymers.

According to one preferred embodiment, the polymeric material is a thermoplastic having a melting point greater than 180° C., more preferably greater than 200° C., and even more preferred between 220–250° C. Preferably, the polymeric material is a thermoplastic selected from nylon 6, nylon 12, nylon 66 or mixtures thereof.

According to another embodiment, the composite may comprise a thermally sensitive additive which is sensitive to elevated processing temperatures to result in a novel composite product. Since the polymer/fiber composites of the invention can be processed at lower temperatures, thermally sensitive additives otherwise incompatible with a polymeric material due to high processing temperatures can be employed. For example, an additive which can not be employed in a nylon injection molding application because of the high temperatures conventionally employed may be used with nylon according to the present invention since lower processing temperatures may be used. The result is a novel injection molded product having improved properties and characteristics. Suitable thermally sensitive additives include anti-microbial compounds, colorants, and fragrances.

The reinforced composites according to the invention have improved properties and characteristics. Advantageously, the composite of the invention has improved properties with only modest density increases of the polymeric matrix material. More specifically, the cellulosic fibers of the invention can be added to the polymeric matrix material without major increases in the density of the resulting composite material, unlike what occurs when reinforced with equivalent amounts by weight of the more dense glass fiber or mineral material alternates (e.g., see Table IVA in Example 1)

According to one embodiment, the composite has a density less than 30% different from the unfilled polymeric material and a tensile strength 10% greater than that of the unfilled polymeric material. More preferably, the composite has a density less than 20% different from and a tensile strength 20% greater than that of the polymeric material.

According to another embodiment, the composite has a density less than 30% different from and a tensile modulus 50% greater than that of the polymeric material. Preferably, the composite has a density less than 20% different from and a tensile modulus 80% greater than that of the polymeric material.

According to yet another embodiment, the composite has a density less than 30% different from and a flexural strength 25% greater than that of the polymeric material. Preferably, the composite has a density less than 20% different from and a flexural strength 45% greater than that of the polymeric material.

According to a still further embodiment, the composite has a density less than 30% different from and a notched Izod impact strength less then 30% different from that of the polymeric material. Preferably, the composite has a density less than 20% different from and a notched Izod impact strength equal to or greater than that of the polymeric material.

Another advantage of the invention is the reduced discoloration in the resultant composite. Prior use of pulp fibers typically resulted in substantial or severe discoloration of the final product. This discoloration is significantly reduced or avoided using the present invention.

The composite may further comprise at least one coupling agent or compatibilizer. Suitable agents include titanates, zirconates or mixtures thereof. Preferably, the coupling agent is present in an amount greater than 0.0001% and less than 3% by weight, more preferably in an amount less than 2% by weight.

The composite may further comprise at least one colorant to alter the color of the composite. Suitable colorants include carbon black, $TiO_2$ and the like.

Another embodiment of the invention relates to a composite comprising at least 5 wt % fibers dispersed in a matrix comprising a polymeric material, wherein the composite has a density less than 5% greater than the polymeric material and a tensile strength 2% greater than the tensile strength of said polymeric material. Preferably, the composite has a density less than 2% greater than the polymeric material and a tensile strength 3% greater than the tensile strength of said polymeric material.

Another aspect of the invention relates to methods of making the improved composite material comprising the cellulosic pulp fibers and the polymeric material. According to one embodiment, the mixture is formed by blending granules of the polymeric material with the pulp fibers to form a composite blend. The pulp fibers may be granulated fibers or pelletized fibers. The polymeric material may be in the form of granules, pellets, particulates, fibers or the like.

One embodiment relates to a method of making a composite material comprising the steps of:
  (a) forming a mixture comprising cellulosic pulp fibers and polymeric material; and
  (b) melt blending said mixture to form said composite material;
  wherein said cellulosic pulp fibers has an alpha-cellulose purity greater than 80% by weight.

The polymeric/pulp fiber mixture should have a moisture content less than 5% by weight, preferably less than 1% by weight and/or is substantially free of solvent. Preferably, the cellulosic pulp fibers are dried prior to said blending.

According to one embodiment, the method further comprises the step of granulating the pulp material prior to forming the mixture. Suitable granulating devices include a rotary knife cutter.

According to another embodiment, the method further comprises the step of pelletizing the fibers to form pellets of the fibers prior to forming the mixture.

One preferred embodiment relates to a method comprising melt blending/extruding the mixture of polymeric material and cellulosic pulp fibers to form an extruded composite. Preferably, the melt blending/extruding is achieved using a twin-screw extruder.

One surprising advantage resulting from the invention is the ability to melt blend the polymeric material with the pulp fibers at lower temperatures. Preferably, the blending is at a blending temperature below the melting temperature of the polymeric material, more preferably, the blending is at a blending temperature at least 10° F. less than the melting temperature of the polymeric material, even more preferably at least 20° F. less, even more preferably at least 30° F. less and most preferred at least 50° F. less.

The method of the invention may further comprise the step of comminuting the composite blend to form composite granules suitable for use in applications such as injection molding, melt extrusion, melt pultrusion, etc.

Another aspect of the invention relates to the use of the composite materials of the invention to form an injection molded product. Accordingly, one embodiment of the invention relates to a method comprising the step of injection molding the composite material to form an injected molded product. Preferably, the method comprises injection molding granules of the composite.

Surprisingly, the use of the cellulosic pulp fibers of the invention enables injection molding to occur at reduced temperatures relative to injection molding composites containing fillers such as glass fibers and mineral fillers (e.g., wollastonite).

According to one embodiment, the injection molding is at processing temperatures below the processing temperature for molding glass- and mineral-filled polymers. Preferably the injection molding processing temperature is at least 20° F. less than the melting temperature of the polymeric material, more preferably at least 30° F. less than the melting temperature of the polymeric material, more preferably at least 40° F. less than the melting temperature of the polymeric material and most preferably at least 50° F. less than the melting point of the polymeric material. In the examples shown in Table VI, the cellulose fiber composites were injection molded at nozzle and barrel zone temperatures approximately 100° F. less than those for the glass- and mineral-filled polymers.

Yet another aspect of the invention relates to methods of using the improved composites to form improved products such as composite granules and injection molded products.

One embodiment of the invention relates to a composite granule composed of fiber-reinforced polymeric material comprising a multiplicity of the cellulosic pulp fibers dispersed in a matrix of thermoplastic material. Preferably, the granules have a largest dimension less than 10 mm.

Another embodiment of the invention relates to an injection molded product of the fiber-reinforced thermoplastic material comprising the cellulosic pulp fibers dispersed in a matrix of the thermoplastic material. The injection molded product may have a complex shape with multiple sharp corner radii.

EXAMPLES

The following examples are illustrative of some of the products and methods of making the same falling within the scope of the present invention. They are, of course, not to be considered in any way limitative of the invention. Numerous changes and modifications can be made with respect to the invention by one of ordinary skill in the art.

Example 1

Formation of Composites by Twin Screw Extrusion

Pulp fiber/polymer composites were formed by blending granulated pulp fiber and nylon 6 granules in a Davis & Standard (Pawcatuck, Conn.) twin screw extruder, which is a 32 mm diameter co-rotating extruder, with intermeshing segmented screws with L/D ratios of 32:1. The extruder has seven heated zones.

The composite samples had the following components as set forth in Table I:

TABLE I

| Sample | Components |
|---|---|
| Nylon 6: | Ashlene 829L[a] |
| 30ULT-0-0-N6: | 30% Ultranier-J Pulp\70% Nylon 6 (Ashlene 829L) |
| 30ULT-2-0-N6: | 30% Ultranier-J Pulp\2% L44-N[b]\68% Nylon 6 (Ashlene 829L) |
| 30ULT-4-0-N6: | 30% Ultranier-J Pulp\4% L44-N\66% Nylon 6 (Ashlene *829L) |
| 30WOL-0-0-N6: | 30% Wollastonite\70% Nylon 6 (Ashlene 829L) |
| 30RAY-0-0-N6: | 30% Rayfloc-J-LD Pulp\70% Nylon 6 (Ashlene 829L) |
| 30RAY-2-0-N6: | 30% Rayfloc-J-LD Pulp\2% L44-N\68% Nylon 6 (Ashlene 829L) |
| 30ULT-0-0-N6: | 30% Ultranier-J Pulp\70% Nylon 6 (Ashlene 829L) |
| 30ULT-2-0-N6: | 30% Ultranier-J Pulp\2% L44-N\68% Nylon 6 (Ashlene 829L) |
| 30POR-0-0-N6: | 30% Porosanier-J-HP Pulp\70% Nylon 6 (Ashlene 829L) |
| 30POR-2-0-N6: | 30% Porosanier-J-HP Pulp\2% L44-N\68% Nylon 6 (Ashlene 829L) |
| 30ETH-0-0-N6: | 30% Ethenier-F-UHV Pulp\70% Nylon 6 (Ashlene 829L) |
| 30HTH-2-0-N6: | 30% Ethenier-F-UHV Pulp\2% L44-N\68% Nylon 6 (Ashlene 829L) |
| 30SUL-0-0-N6: | 30% Sulfatate-H-J Pulp\70% Nylon 6 (Ashlene 829L) |
| 30SUL-2-0-N6: | 30% Sulfatate-H-J Pulp\2% L44-N\68% Nylon 6 (Ashlene 829L) |
| 30PLA-0-0-N6: | 30% Placetate-F Pulp\70% Nylon 6 (Ashlene 829L) |
| 30PLA-2-0-N6: | 30% Placetate-F Pulp\2% L44-N\68% Nylon 6 (Ashlene 829L). |
| 33GLA-0-0-N6: | 33% Fiberglass Reinforced Nylon 6 (Ashlene 830L-33G)[a] |

(a) Ashlene 829L and Ashlene 830L-33G are available from Ashley Polymers (Brooklyn, N.Y.)

(b) Ken React L44-N is a titanate compatibilizer obtained from Kenrich Petrochemicals (Bayonne, N.J.)

Initially, extruder temperatures were above the melt temperature of the nylon 6 polymeric material. Then temperatures were reduced as the nylon 6/cellulosic fiber blends were introduced into the extruder. The steady state processing conditions for each of the sample runs are set forth in Table II; the zone temperatures given represent their temperature at steady state. Note that in most of the latter runs listed in the Table, zone 1 temperature of 400° F. was used. This is 30° F. below the melting point of the pure nylon 6 (Ashlene 829L) polymer.

The extruded composite products were subsequently comminuted to form composite granules suitable for use in applications such as injection molding.

The samples made at 30% loading were injection molded into identical "dogbone" shaped test specimens of equal volume and tested for mechanical properties in a dry, "as-made", condition against injection molded controls of pure nylon 6 (Ashlene 829L) and nylon 6 filled with 33% glass (commercially available as Ashlene 830L-33G) and with 30% wollastonite (an inexpensive fibrous mineral material—this composite material was prepared by RTP Corporation).

Injection molding was carried out using a Cincinnati Milacron—33 ton reciprocating screw—Type VS 33, 28 mm frame injection molder with screw diameter of 32 mm; L/D of 20:1, nozzle of 3.2 mm. The processing conditions for each of the sample runs are set forth in Table III.

TABLE II

Overview of Twin Screw Extrusion Processing (U.S.)

| Study: Sample: | Rayonier Six Specialty Pulp Fiber/Nylon 6 Composites | | | | | | | Die Face (° F.) | Melt Temp (° F.) | Perct. Load | Melt Press (PSI) | Screw (RPM) |
|---|---|---|---|---|---|---|---|---|---|---|---|---|
| | Zone 1 (° F.) | Zone 2 (° F.) | Zone 3 (° F.) | Zone 4 (° F.) | Zone 5 (° F.) | Zone 6 (° F.) | Zone 7 (° F.) | | | | | |
| Nylon 6[a] | — | — | — | — | — | — | — | — | — | — | — | — |
| 30ULT-0-0-N6 | 440 | 410 | 395 | 250 | 235 | 235 | 235 | 445 | 437 | 70 | 520 | 310 |
| 30ULT-2-0-N6(L44-N) | 435 | 410 | 395 | 230 | 230 | 230 | 230 | 445 | 444 | 72 | 500 | 310 |
| 30ULT-4-0-N6(L44-N) | 435 | 410 | 395 | 220 | 220 | 220 | 220 | 445 | 436 | 70 | 520 | 330 |
| 30WOL-0-0-N6[a,b] | — | — | — | — | — | — | — | — | — | — | — | — |
| 30RAY-0-0-N6 | 425 | 400 | 375 | 180 | 180 | 180 | 180 | 425 | 434 | 80 | 540 | 260 |
| 30RAY-2-0-N6(L44-N) | 400 | 375 | 350 | 180 | 180 | 180 | 180 | 421 | 431 | 80 | 500 | 280 |
| 300ULT-0-0-N6 | 450 | 425 | 400 | 215 | 215 | 215 | 215 | 445 | 445 | 60 | 350 | 310 |
| 300ULT-2-0-N6(L44-N) | 440 | 420 | 400 | 200 | 200 | 200 | 200 | 445 | 465 | 80 | 330 | 330 |
| 30POR-0-0-N6 | 425 | 400 | 375 | 180 | 180 | 180 | 180 | 430 | 446 | 71 | 320 | 310 |
| 30POR-2-0-N6(L44-N) | 400 | 375 | 350 | 160 | 160 | 160 | 160 | 425 | 434 | 83 | 350 | 310 |
| 30ETH-0-0-N6 | 400 | 360 | 320 | 170 | 170 | 170 | 180 | 423 | 429 | 65 | 320 | 300 |
| 30ETH-2-0-N6(L44-N) | 400 | 360 | 320 | 170 | 170 | 170 | 170 | 425 | 427 | 70 | 420 | 300 |
| 30SUL-0-0-N6 | 425 | 380 | 340 | 180 | 180 | 180 | 180 | 435 | 454 | 82 | 370 | 330 |
| 30SUL-2-0-N6(L44-N) | 400 | 375 | 350 | 185 | 185 | 185 | 185 | 435 | 460 | 85 | 500 | 340 |
| 30PLA-0-0-N6 | 415 | 380 | 330 | 150 | 150 | 150 | 150 | 425 | 426 | 65 | 370 | 300 |
| 30PLA-2-0-N6(L44-N) | 400 | 375 | 350 | 150 | 150 | 150 | 150 | 422 | 422 | 70 | 600 | 300 |
| 33GLA-0-0-N6[a,b] | — | — | — | — | — | — | — | — | — | — | — | — |

[a]not processed through the twin screw extruder.
[b]obtained in pre-blended composite form for injection molding.

TABLE III

OVERVIEW OF INJECTION MOLDING PROCESSING (U.S.)

Rayonier Six Specialty Pulp Fiber/Nylon 6 Composites

| Study Sample | Pack Press (PSI) | Hold Press (PSI) | Mold Temp (° F.) | Nozzle Temp (° F.) | Zone 1 (° F.) | Zone 2 (° F.) | Zone 3 (° F.) | Inj. High (s) | Pack Time (s) | Hold Time (s) | Cool Time (s) | Cushion |
|---|---|---|---|---|---|---|---|---|---|---|---|---|
| Nylon 6 | 450 | 450 | 104 | 440 | 460 | 460 | 460 | 15 | 5 | 5 | 5 | 0.19 |
| 30ULT-0-0-N6 | 800 | 800 | 243 | 440 | 450 | 450 | 450 | 15 | 5 | 10 | 30 | 0.27 |
| 30ULT-2-0-N6 (L44-N) | 800 | 800 | 250 | 440 | 450 | 450 | 450 | 15 | 5 | 10 | 10 | 0.26 |
| 30ULT-4-0-N6 (L44-N) | 800 | 800 | 250 | 440 | 450 | 450 | 450 | 15 | 5 | 10 | 10 | 0.27 |
| 30WOL-0-0-N6 | 750 | 750 | 240 | 450 | 460 | 460 | 460 | 15 | 5 | 10 | 30 | 0.20 |
| 30RAY-0-0-N6 | 800 | 800 | 250 | 440 | 460 | 460 | 460 | 15 | 5 | 10 | 10 | 0.20 |
| 30RAY-2-0-N6 (L44-N) | 800 | 800 | 250 | 440 | 460 | 460 | 460 | 15 | 5 | 10 | 10 | 0.22 |
| 30ULT-0-0-N6 | 800 | 800 | 250 | 440 | 450 | 450 | 450 | 15 | 5 | 10 | 30 | 0.31 |
| 30ULT-2-0-N6 (L44-N) | 800 | 800 | 250 | 440 | 450 | 450 | 450 | 15 | 5 | 10 | 10 | 0.28 |
| 30POR-0-0-N6 | 800 | 800 | 250 | 440 | 460 | 460 | 460 | 15 | 5 | 10 | 15 | 0.23 |
| 30POR-2-0-N6 (L44-N) | 800 | 800 | 250 | 450 | 460 | 460 | 460 | 15 | 5 | 10 | 15 | 0.18 |
| 30ETH-0-0-N6 | 750 | 750 | 250 | 440 | 450 | 450 | 450 | 15 | 5 | 10 | 10 | 0.31 |
| 30ETH-2-0-N6 (L44-N) | 900 | 800 | 250 | 440 | 460 | 460 | 460 | 15 | 5 | 10 | 10 | 0.26 |
| 30SUL-0-0-N6 | 800 | 80 | 250 | 450 | 460 | 460 | 460 | 15 | 5 | 10 | 15 | 0.23 |
| 30SUL-2-0-N6 (L44-N) | 800 | 800 | 250 | 450 | 460 | 460 | 460 | 15 | 5 | 10 | 15 | 0.23 |
| 30PLA-0-0-N6 | 850 | 800 | 250 | 440 | 460 | 460 | 460 | 15 | 5 | 10 | 10 | 0.26 |
| 30PLA-2-0-N6 (L44-N) | 850 | 800 | 250 | 440 | 460 | 460 | 460 | 15 | 5 | 10 | 10 | 0.29 |
| 33GLA-0-0-N6 | 650 | 400 | 248 | 530 | 550 | 550 | b50 | 15 | 5 | 20 | 20 | 0.34 |

Some of the best mechanical property results obtained in this particular study are presented in Table IVA. The two pulps that yielded the best results were the hardwood pulp, Sulfatate-H-J, and the softwood pulp, Placetate-F. Of these improvement in properties that can result by incorporating a compatibilizer such as the L-44N titanate (e.g., note the improved values for the Placetate and Sulfatate composites containing 2% L-44N versus those without).

TABLE IVA

Mechanical Property Data On Dry ("as made") Injection Molded Composites[a]

| Sample | Density, g/cm³ | Tensile Strength, MPa | % of Glass[b] | % of Nylon 6 | Tensile Modulus, GPa | % of Glass[b] | % of Nylon 6 | Flexural Strength MPa | % of Glass[b] | % of Nylon 6 |
|---|---|---|---|---|---|---|---|---|---|---|
| 30 WOL-0-0-N6 | 1.383 | 62.7 | 56.3 | 104.2 | 6.51 | 81.2 | 236.7 | 105.7 | 72.1 | 164.6 |
| 30 PLA-0-0-N6 | 1.220 | 77.2 | 69.4 | 128.2 | 5.12 | 63.8 | 186.1 | 107 4 | 73 2 | 167 3 |
| 30 PLA-2-0-N6 (L44-N) | 1.220 | 81.9 | 73.6 | 136.0 | 5.35 | 66.7 | 192.7 | 113.9 | 77.6 | 177.4 |
| 30 SUL-0-0-N6 | 1.218 | 80.9 | 72.7 | 134.4 | 5.21 | 65.0 | 189.4 | 113.1 | 77.1 | 176 2 |
| 30 SUL-2-0-N6 (L44-N) | 1.228 | 86.5 | 77.7 | 143.7 | 5.71 | 71.2 | 207.6 | 121.6 | 82.9 | 189.4 |
| 33 GLA-0-0-N6 | 1.351 | 111.3 | 100.0 | 184.9 | 8.02 | 100.0 | 291.6 | 146.7 | 100.0 | 228 5 |
| Nylon 6 | 1.138 | 60.2 | 54.0 | 100.0 | 2.75 | 34.3 | 100.0 | 64.2 | 43.8 | 100.00 |

| | Flexural Modulus, GPa | % of Glass[b] | % of Nylon 6 | Notched Izod, J/M | % of Glass[b] | % of Nylon 6 | Un-Notched Izod, J/M | % of Glass[b] | % of Nylon 6 |
|---|---|---|---|---|---|---|---|---|---|
| 30 WOL-0-0-N6 | 6.27 | 83.0 | 263.4 | 25.83 | 56.5 | 107.5 | 174.48 | 43.0 | 23.4 |
| 30 PLA-0-0-N6 | 5.11 | 67.7 | 214.7 | 23.20 | 50.8 | 96.5 | 239.53 | 59.1 | 32.1 |
| 30 PLA-2-0-N6 (L44-N) | 5.45 | 72.2 | 229.0 | 25.10 | 54.9 | 104.4 | 246.65 | 60.8 | 33.1 |
| 30 SUL-0-0-N6 | 5.38 | 71.3 | 226.0 | 23.80 | 52.1 | 99.0 | 278.20 | 68.6 | 37.3 |
| 30 SUL-2-0-N6 (L44-N) | 5.88 | 77.9 | 247.0 | 25.28 | 55.3 | 105.2 | 318.33 | 78.5 | 42.6 |
| 33 GLA-0-0-N6 | 7.55 | 100.0 | 317.2 | 45.70 | 100 | 190.2 | 405.58 | 100.0 | 54.4 |
| Nylon 6 | 2.38 | 31.4 | 100.0 | 24.03 | 52.6 | 100.0 | 745.85 | 183.9 | 100.0 |

[a]Identical "dog-bone" shaped parts of equal volume.
[b]33 GLA-0-0-N6 two pulps, the fibrous hardwood pulp gave superior results. Both of these pulps are of high cellulose purity (alpha-cellulose contents of about 98% for each). Mechanical property test results from the least pure pulp utilized in this study (Rayfloc-J-LD) are illustrated in Example 3.

The results in Table IVA also illustrate the lower density (lighter weight) materials that can be prepared using cellulose fiber reinforcement versus the heavier glass or mineral (e.g. Wollastonite) materials. They also indicate the In Table IVB are presented the specific mechanical property results on the best Sulfatate and Placetate nylon 6 composites given in Table IVA. These data reflect the mechanical properties that would result from making injection molded parts of equal weight rather than parts of equal volume (the density or specific gravity of the composites is factored into the determination of these values—see footnote "a" of Table IVB).

TABLE IVB

Specific Mechanical Property Data on Injection Molded Composites[a]

| Sample | Filler | Tensile Strength MPa | % of Glass[b] | % of Nylon 6 | Tensile Modulus GPa | % of Glass[b] | % of Nylon 6 | Flexural Strength MPa | % of Glass[b] | % of Nylon 6 |
|---|---|---|---|---|---|---|---|---|---|---|
| 30 WOL-0-0-N6 | Wollastonite | 45.3 | 55 | 86 | 4.71 | 79 | 195 | 76.4 | 70 | 136 |
| 30 PLA-2-0-N6 (L-44N) | Placetate | 67.1 | 81 | 127 | 4.39 | 74 | 182 | 93.4 | 86 | 166 |
| 30 SUL-2-0-N6 (L-44N) | Sulfatate | 70.4 | 85 | 133 | 4.65 | 78 | 193 | 99.0 | 91 | 176 |
| 33 GLA-0-0-N | Glass fiber | 82.4 | 100 | 156 | 5.93 | 100 | 246 | 108.6 | 100 | 193 |
| NYLON-6 | none | 52.9 | 64 | 100 | 2.41 | 41 | 100 | 56.4 | 52 | 100 |

| Sample | Filler | Flexual Modulus GPa | % of Glass[b] | % of Nylon 6 | Notched Izod, J/M | % of Glass[b] | % of nylon 6 | Un-notched Izod, J/M | % of Glass[b] | % of Nylon 6 |
|---|---|---|---|---|---|---|---|---|---|---|
| 30 WOL-0-0-N6 | Wollastonite | 4.53 | 81 | 217 | 18.7 | 55 | 89 | 126.2 | 42 | 19 |
| 30 PLA-2-0-N6 (L-44N) | Placetate | 4.47 | 80 | 214 | 20.6 | 61 | 98 | 202.2 | 67 | 31 |
| 30 SUL-2-0-N6 (L-44N) | Sulfatate | 4.79 | 86 | 229 | 20.6 | 61 | 97 | 259.2 | 86 | 40 |
| 33 GLA-0-0-N6 | Giass fiber | 5.59 | 100 | 267 | 33.8 | 100 | 160 | 300.2 | 100 | 46 |
| NYLON 6 | none | 2.09 | 37 | 100 | 21.1 | 62 | 100 | 655.4 | 218 | 100 |

[a]Values for parts ("dogbones") of equal weight--density or specific gravity differences noted in Table IVA are factored in (i.e., values in Table IVA are divided by the density of the composite to obtain the values presented here).
[b]33 GLA-0-0-N6

Clearly the composites made according to the invention have substantially improved properties relative to the non-reinforced thermoplastic material (i.e., nylon 6 in this example). It is also apparent that the reinforcement performance of the high alpha-cellulose pulps, Sulfatate-H-J and Placetate-F in this Example, approaches that of glass fiber particularly when making parts or components of equal weight (e.g., from Table IVB note that the specific flexural strength and modulus values for 30% Sulfatate-H-J reinforcement are 91 and 86%, respectively, of the counterpart values for 33% glass reinforced nylon 6. These results are outstanding and represent a major technological advance (i.e., the reinforcement of a high melting point engineering thermoplastic such as nylon 6 with cellulosic fibers to yield reinforcement properties approaching those of glass fibers). If results were "normalized" for 30% glass fiber rather than 33%, the results for 30% Sulfatate and Placetate would appear even better.

Additionally, the composites of the invention also are less abrasive to the processing equipment than glass or mineral materials.

Example 2
Injection Molding Trials

Injection molding trial runs were performed using an Engel injection molding machine of an early 1980's Model (165 ton—7 oz.—3 heat zone). The mold was a water heated (190° F.), single sprue, two cavity mold for a Westinghouse® electrical cable harness/separation product. The molded part was 50 mm×135 mm and had a complex geometry for filling the mold completely. The product has 11 tabs and 20 sharp corner radii that require adequate filling for product acceptance. The part is a good demonstration of a polymeric composite's ability to flow.

Two different cellulose polyamide composite (CPCs) and two mineral polyamide composites (MPCs) blends from Example 1, along with Rayfloc-J similarly melt blended with a maleated polypropylene compatibilizer (1%) and carbon black colorant (1%), were injection molded to determine the feasibility of injection molding on a small/medium scale commercial injection molding machine. The composite blends are in the order in which they were injection molded and are as follows:

| Sample No | Composite Composition |
|---|---|
| Run #1 - 30ULT-2-0-N6 | 30% Ultranier-J\2% L44-N\68% Nylon 6 |
| Run #2 - 30ULT-0-0-N6 | 30% Ultranier-J\70% Nylon 6 |
| Run #3 - 30RAY-1-1-N6 | 30% Rayfloc-J-LD\1% MP1000\1% Black\68% Nylon 6 |
| Run #4 - 33GLA-0-0-N6 | 33% Glassfiber\67% Nylon 6 |
| Run #5 - 30WOL-0-0-N6 | 30% Wollastonite\70% Nylon 6 |

Run #1—Sample 30ULT-2-0-N6

At the beginning of the trial, the heat zone temperature settings were in the range of 515° F. because this was the expected regular processing temperatures for nylon 6 composites. Not surprisingly, the first products from the injection mold burned.

As a result, the temperatures were reduced to 450° F. at the nozzle and 460° F. across the board for the three heat zones. An attempt was made to injection mold the first cellulose pulp composite. It was successful in filling the mold, but was somewhat dark in color, which was an indication of too high of a temperature setting. As the molding continued, the temperatures were continually set lower and lower and the composites progressed from black to brown to high quality parts.

The temperatures were reduced further to 420° F. at the nozzle and 390° F. in all three barrel heat zones. As the temperatures declined the product quality improved dramatically. There was some "orange-peel" effects on the surface quality of the finished products. It is believed that if the mold was oilsteam heated, a high gloss finish would have been produced. Moreover, the mold was steel rather than stainless steel. Stainless steel helps with a surface finish. This is an important note to make if a high gloss surface finish is desired. There was some difficulty feeding the material from the hopper into the injection screw. As a result, a high RPM screw velocity was used to convey the material toward the nozzle. This may have induced some shear heating of the polymer, as well as some fiber degradation.

Run #2—Sample 30ULT-0-0-N6

The 30ULT-0-0-N6 sample ran well using the processing parameters which were already set up from Run #1. The un-coupled CPCs were lighter in color because no L-44-N was used during compounding. The L-44-N changes the color of the composites to a tan color. The composites had some orange peel effect again due to the water heated mold vs. oil\steam heating and higher temperatures available for mold heating. Overall, this was a successful run using an un-coupled composite system on a small\medium commercial scale injection molding machine.

Run #3—Sample 30RAY-1-1-0-N6

The 30RAY-1-1-0-N6 sample (not from Example 1) was selected to evaluate how the black colorant affects the processing and product appearance of the composites. Processing conditions were set using the conditions of Run #2. The material started to flash excessively on the first few parts and it appears that the colorant may be acting as a processing aid\internal lubricant. Since, the colorant was acting as a processing aid, the nozzle temperature was reduced to 400° F. from 420° F., as was the injection pressure. It was an interesting observation that the nozzle and three heat zones were all set at 400° F. and below, which is 30° F. below the melting point of the nylon 6 (Ashlene 829L). The resultant composites appeared to have uniform coloration, but was not absolute due to the same orange peel effect of the surface of the part. This run provided a good indication of how these composites can be colored. Using a $TiO_2$ additive to produce a cream colored composite would provide the range of colors from cream to black.

Run #4—Comparative Sample 33GLA-0-0-N6

After the three CPC trial runs, the 33GLA-0-0-N6 composite was molded into products. The nozzle temperature was raised to 500° F. and all three heat zones were set to 500° F. as well. Molding with the glass filled nylon 6 was easy at these high temperatures and the material filled out the mold very well. The composites still had some flashing and orange peel on the surface, like all of the other CPCs. The resultant composites were cream white to grayish in color. One interesting observation is the increased temperatures required to mold the glass composites. The injection molding conditions of the inventive composites were over 100° F. below that of the glassfiber composites.

Run #5—Comparative Sample 30WOL-0-0-N6

In addition to cellulose and glassfiber reinforced polyamide composites, a wollastonite reinforced composite (30WOL-0-0-N6) was also molded using the same conditions used for the 33GLA-0-0-N6 composite (Run #4). The first few samples were somewhat problematic to mold, but the parts filled completely with some flashing due to the mold itself. The composites were cream white to grayish in color with some orange peel on the surface. The problem with the molding continued and it was determined that there was some moisture uptake after drying. There was only a limited number of samples produced (five sets in all). The run was stopped after the moisture problem was identified.

Summary & Comments Reaardina Runs #1 through #5

After reaching reasonable molding conditions for the 165 ton—7 oz. injection molding machine, the injection molding of the electrical wiring cable harness proceeded smoothly. The sharp reductions (i.e. greater than 100° F.) in processing temperatures using the inventive composites were surprising and unexpected. A summary of the composites is set forth in Table V. The processing conditions are summarized in Table VI below:

TABLE V

INJECTION MOLDING SAMPLE IDENTIFICATION

| Sample | Matrix | Coupling Agent | Fiber | Colorant |
| --- | --- | --- | --- | --- |
| 30ULT-2-0-N6 | 68%-N6 | 2% L44-N | 30% Ultranier | None |
| 30ULT-0-0-N6 | 70%-N6 | None | 30% Ultranier | None |
| 30RAY-1-1-N6 | 68%-N6 | 1% MP1000 | 30% Rayfloc | 1% BLK |
| 33GLA-0-0-N6 | 67%-N6 | None | 33% Glass | None |
| 30WOL-0-0-N6 | 70%-N6 | None | 30% Wollastonite | None |

TABLE VI

OVERVIEW OF INJECTION MOLDING PROCESSING (U.S.)

| Sample | Pack (PSI) | Hold (PSI) | Mold Temp (° F.) | Nozzle (° F.) | Zone 1 (° F.) | Zone 2 (° F.) | Zone 3 (° F.) | Inj. High (s) | Pack Time (s) | Hold Time (s) | Cool Time (s) |
| --- | --- | --- | --- | --- | --- | --- | --- | --- | --- | --- | --- |
| 30ULT-2-0-N6 | 500 | 500 | 190 | 420 | 390 | 390 | 395 | 5 | 10 | 10 | 12 |
| 30ULT-0-0-N6 | 500 | 500 | 190 | 390 | 390 | 395 | 395 | 5 | 10 | 10 | 12 |
| 30RAY-1-1-N6 | 450 | 500 | 190 | 400 | 390 | 390 | 395 | 5 | 10 | 10 | 12 |
| 33GLA-0-0-N6 | 500 | 500 | 190 | 500 | 500 | 500 | 500 | 5 | 10 | 10 | 14 |
| 30WOL-0-0-N6 | 500 | 500 | 190 | 500 | 500 | 500 | 500 | 5 | 10 | 10 | 14 |

Overall, the injection molding trial runs were successful in terms of obtaining an acceptable injection molded product. Low temperature processing was confirmed as was weld line strength, the effects of colorants as a processing aid, and the mold temperature effect on surface quality.

Example 3
Pelletized Fibers Versus Granulated Fibers

Rayfloc-J pulp in fibrous form having a Kajaani weighted average fiber length (WAFL) of 2.2 mm was mixed in a Hobart mixer with water, sodium carboxymethyl cellulose binder [type Na-CMC-7H4F (Hercules Aqualon Division)] and Berocell 509 softening agent (Eka Chemicals, Paper Chemicals Division). The ratios of dry fiber to the CMC binder and Berocell softening agent were 100:0.5:0.5, respectively. After blending in a Hobart mixer, the mixture was fed to a Kahl pelletizing mill to form cylindrical pellets [Kahl Pellet Mill, type L175 (Amandus Kahl Nachf.—Hamburg, Germany)]. The pulp was pelletized at about 60–70% moisture content with the Kahl mill being operated at variable feed rates that allowed the pellets to discharge at between 0.1 to 0.3 kg/min. The pellets were dried overnight at 190° F. A typical pellet was from 6–8 mm in diameter with a length of 3–5 mm. The pellet density was around 0.6 g/cm³. This densification improves material handling properties and easier feeding of the extruder equipment.

After pelletizing, Kajanni fiber length measurements determined that the WAFL was 1.8 mm. The pellets (designated RAY-P) were blended with Nylon 6 (Ashlene 829L) in a weight ratio of 30:70. Of this total blended amount, 29.7% is fiber, 0.15% is CMC, 0.15% is Berocell, and 70% is Nylon 6.

As a control blend, granulated Rayfloc-J pulp fiber (WAFL of 1.1 mm), designated RAY-G, was blended with Nylon 6 in a 30:70 weight ratio.

Each of the resulting blends above (i.e., RAY-P and RAY-G with Nylon 6) were processed through the twin screw extruder (Davis-Standard 32 mm, co-rotating, intermeshing screws) using the same conditions [The Zone 1–7 temperatures (° F.) were 450, 425, 400, 225, 225, 225, and 225, respectively. The die face temperature was 430° F.].

The melt blended composites were then injection molded (Cincinnati Milicron-33 ton reciprocating screw-Type VS 33, 28 mm frame) using the same conditions (450° F., screw velocity of 50 rpm, cycle time of 35 seconds). Injection molded parts were evaluated by standard ASTM procedures for their mechanical properties. Evaluation of these properties were made on a dry, "as-made" condition, and after conditioning in 50% relative humidity (RH) at 72° F. for 40 hours (standard ASTM conditions) to obtain what are referred to as conditioned, "in-service" values. The results are summarized in the Tables below.

Mechanical Property Results of Injection Molded 30% Composite Blends of RAY-G and RAY-P with Nylon 6

TABLE VII-A

| | Dry, "As-Made", Values | | | | | |
|---|---|---|---|---|---|---|
| Fiber Source | Tensile Strength (MPa) | Tensile Modulus (GPa) | Flexural Strength (MPa) | Flexural Modulus (GPa) | Notched Izod Impact (J/M) | Unnotched Izod Impact (J/M) |
| RAY-G[1] | 69.9 | 5.51 | 80.6 | 4.28 | 21.73 | 221.64 |
| RAY-P[2] | 79.0 | 5.63 | 84.2 | 4.58 | 23.78 | 283.66 |

[1]WAFL of RAY-G = 1.1 mm.
[2]WAFL of RAY-P = 1.8 mm.

TABLE VII-B

| % Improvement of RAY-P Versus RAY-G Composites (Dry) | | | | | |
|---|---|---|---|---|---|
| Tensile Strength | Tensile Modulus | Flexural Strength | Flexural Modulus | Notched Izod Impact | Unnotched Izod Impact |
| 14.3 | 2.2 | 4.5 | 7.0 | 9.4 | 28.0 |

TABLE VII-C

| | Conditioned (50% RH @ 72° F. for 40 hours), "In-Service", Values | | | | | |
|---|---|---|---|---|---|---|
| Fiber Source | Tensile Strength (MPa) | Tensile Modulus (GPa) | Flexural Strength (MPa) | Flexural Modulus (GPa) | Notched Izod Impact (J/M) | Unnotched Izod Impact (J/M) |
| RAY-G[1] | 88.2 | 5.47 | 83.2 | 4.41 | 21.98 | 232.02 |
| RAY-P[2] | 80.0 | 5.74 | 88.1 | 4.73 | 22.47 | 291.39 |

[1]WAFL of RAY-G = 1.1 mm.
[2]WAFL of RAY-P = 1.8 mm.

TABLE VII-D

| % Improvement of RAY-P Versus RAY-G Composites Conditioned) | | | | | |
|---|---|---|---|---|---|
| Tensile Strength | Tensile Modulus | Flexural Strength | Flexural Modulus | Notched Izod Impact | Unnotched Izod Impact |
| 17.3 | 4.9 | 5.9 | 7.3 | 2.2 | 25.6 |

It is noted from the data set forth in Tables VII A–D that use of fiber in pelletized form in which the fiber length is longer than in granulated form (1.8 versus 1.1 mm) leads to improvements across the board in mechanical properties (whether evaluated in "dry" or "conditioned" states). The greatest improvements are in tensile strength and unnotched Izod impact properties (14–28% improvements). Overall, the finding of such major increases on pre-pelletizing the cellulose feed to the extruder is a major advancement in cellulose polyamide composite preparation.

It is also interesting to note that "conditioning" resulted in absolute mechanical property values that were generally improved relative to their "dry" values (e.g., with RAY-P, all values increased upon conditioning except for notched Izod values). Since Nylon 6 itself tends to lose tensile and flexural strength and modulus properties upon conditioning, this improves the properties of the cellulose fiber reinforced Nylon 6 (e.g., with RAY-P, see Table VIII below) even more. This can be easily noted from analysis of the below values (dry and conditioned) of injection molded Nylon 6 itself, prepared at the same time as the above samples for comparative purposes.

Mechanical Properties of Injection Molded Nylon 6, and 30% Composite of RAY-P and Nylon 6.

TABLE VIII-A

Nylon 6, Dry and Conditioned Values

|  | Tensile Strength (MPa) | Tensile Modulus (GPa) | Flexural Strength (MPa) | Flexural Modulus (GPa) | Notched Izod Impact (J/M) | Unnotched Izod Impact (J/M) |
|---|---|---|---|---|---|---|
| Dry | 60.9 | 2.77 | 66.0 | 2.96 | 17.14 | 746.63 |
| Conditioned | 56.2 | 2.47 | 45.8 | 1.94 | 23.80 | 699.54 |

TABLE VIII-B

30% RAY-P and Nylon 6 Composite, Dry and Conditioned Values

|  | Tensile Strength (MPa) | Tensile Modulus (GPa) | Flexural Strength (MPa) | Flexural Modulus (GPa) | Notched Izod Impact (J/M) | Unnotched Izod Impact (J/M) |
|---|---|---|---|---|---|---|
| Dry | 79.0 | 5.63 | 84.2 | 4.58 | 23.78 | 283.66 |
| Conditioned | 80.0 | 5.74 | 88.1 | 4.73 | 22.47 | 291.39 |

TABLE VIII-C

% Mechanical Property Improvement by Reinforcement with 30% RAY-P, Dry and Conditioned (Calculated from Tables VIII-A and VIII-B above)

|  | Tensile Strength (MPa) | Tensile Modulus (GPa) | Flexural Strength (MPa) | Flexural Modulus (GPa) | Notched Izod Impact (J/M) | Unnotched Izod Impact (J/M) |
|---|---|---|---|---|---|---|
| Dry[1] | 29.7 | 103.2 | 27.6 | 54.7 | 38.74 | −62.0 |
| Conditioned[2] | 42.3 | 132.4 | 92.4 | 143.8 | −5.6 | −58.3 |

[1]Results relative to Nylon 6 "dry" values: e.g., for tensile strength, 79.0/60.9 × 100 − 100 = 29.7% increase.
[2]Results relative to Nylon 6 "conditioned" values: e.g., for tensile strength 80.0/56.2 × 100 − 100 = 42.3% increase.

With the exception of notched Izod impact values, mechanical property improvements with 30% reinforcement (utilizing RAY-P as a fiber source) increase to an even greater extent upon conditioning than that observed in the dry state. From Table VIIIC above, it is noted that the biggest improvement is in flexural strength. In the dry, "as-made", state the 30% composite has a value that is 27.6% greater than the "dry" value for Nylon 6 itself. However, upon conditioning, the flexural strength "in-service" value increases to 92.4% above that of its conditioned Nylon 6 counterpart. The results above illustrate the potential that cellulose fibers have to improve the "in-service" mechanical properties of Nylon 6.

The above description of the invention is intended to be illustrative and not limiting. Various changes or modifications in the embodiments described may occur to those of ordinary skill of the art. These can be made without departing from the spirit and scope of the invention.

What is claimed is:

1. A composite containing cellulosic pulp fibers dispersed in a matrix, wherein said matrix comprises a polymeric material and said cellulosic pulp fibers are not coated with a graft copolymer and have an alpha-cellulose purity greater than 80% by weight.

2. The composite of claim 1, wherein said composite comprises less than 50% by weight cellulosic pulp fibers.

3. The composite of claim 2, wherein the starting cellulosic fibers are in the form of loose fibers, granulated fibers, dried crumb pulp, or pelletized fibers.

4. The composite of claim 1, further comprising at least one coupling or compatibilizing agent.

5. A composite containing cellulosic pulp fibers dispersed in a matrix, wherein said matrix comprises a polymeric material and said cellulosic pulp fibers have an alpha-cellulose purity greater than 80% by weight, said composite contains at least one coupling or compatibilizing agent, and wherein said coupling or compatibilizing agent is selected from the group consisting of titanates, zirconates or mixtures thereof.

6. The composite of claim 4, wherein said coupling or compatibilizing agent is present in an amount less than 3% by weight.

7. The composite of claim 1, further comprising at least one colorant.

8. The composite of claim 1, wherein said cellulosic pulp fibers have an average length between 0.1 and 6 mm.

9. The composite of claim 1, wherein said cellulosic pulp fibers have a lignin content less than 2% by weight.

10. The composite of claim 1, wherein said cellulosic pulp fibers have an alpha-cellulose purity greater than 90% by weight.

11. The composite of claim 1, wherein said cellulosic pulp fibers have an alpha-cellulose purity greater than 95% by weight.

12. The composite of claim 1, wherein said cellulosic pulp fibers have an alpha-cellulose purity greater than 98% by weight.

13. The composite of claim 1, wherein said polymeric material comprises a thermoplastic.

14. A composite containing cellulosic pulp fibers dispersed in a matrix, wherein said matrix comprises a thermoplastic and said cellulosic pulp fibers have an alpha-cellulose purity greater than 80% by weight, wherein said thermoplastic has a melting point greater than 180° C.

15. The composite of claim 14, wherein said thermoplastic has a melting point greater than 200° C.

16. The composite of claim 14, wherein said thermoplastic has a melting point greater than 250° C.

17. The composite of claim 14, wherein said thermoplastic comprises a polymer selected from the group consisting of polyamides (nylons), PET (polyethylene terephthalate), PBT (polybutylene terephthalate), PTT (polytrimethylene terephthalate) (e.g., Corterra by Shell), ECM (ethylene-carbon monoxide) (e.g. Carilon by Shell), SAM (styrene/acrylonitrile), SMA (stylene/maleic anhydride) or mixtures thereof.

18. The composite of claim 14, wherein said polymeric material comprises a thermoplastic having a melting temperature between about 180–270° C.

19. A composite containing cellulosic pulp fibers dispersed in a matrix, wherein said matrix comprises a polymeric material and said cellulosic pulp fibers have an alpha-cellulose purity greater than 80% by weight, wherein said polymeric material comprises nylon.

20. The composite of claim 19, wherein said polymeric material comprises a thermoplastic selected from the group consisting of Nylon 6, Nylon 12, Nylon 66 or mixtures thereof.

21. The composite of claim 1, wherein said polymeric material has a density and a tensile strength (dry, unconditioned value), and said composite has a density less than 20% different from and a tensile strength 20% greater than that of said polymeric material.

22. The composite of claim 1, wherein said polymeric material has a density and a tensile modulus (dry, unconditioned value), and said composite has a density less than 20% different from and a tensile modulus 80% greater than that of said polymeric material.

23. The composite of claim 1, wherein said polymeric material has a density and a flexual strength (dry, unconditioned value), and said composite has a density less than 20% different from and a flexual strength 45% greater than that of said polymeric material.

24. The composite of claim 1, wherein said polymeric material has a density and a notched Izod impact strength (dry, unconditioned value), and said composite has a density less than 20% different from and a notched Izod impact strength less than or equal to that of said polymeric material.

25. A composite comprising at least 5 wt % fibers dispersed in a matrix comprising a polymeric material, wherein said fibers are not coated with a graft copolymer and said composite has a density less than 2% greater than said polymeric material and a tensile strength 3% greater than the tensile strength of said polymeric material.

26. A composite granule for injection molding composed of fiber-reinforced thermoplastic material comprising a multiplicity of cellulosic pulp fibers dispersed in a matrix of thermoplastic material, wherein said fibers are not coated with a graft copolymer and said cellulosic pulp fibers have an alpha-cellulose content greater than 80%.

27. An injection molded product of a fiber-reinforced thermoplastic material comprising a multiplicity of cellulosic pulp fibers dispersed in a matrix of the thermoplastic material, wherein said fibers are not coated with a graft copolymer and said cellulosic pulp fibers have an alpha-cellulose content greater than 80%.

28. The composite of claim 5, wherein said coupling or compatibilizing agent is present in an amount less than 3% by weight.

29. The composite of claim 5, further comprising at least one colorant.

30. The composite of claim 5, wherein said cellulosic pulp fibers have an average length between 0.1 and 6 mm.

31. The composite of claim 5, wherein said cellulosic pulp fibers have a lignin content less than 2% by weight.

32. The composite of claim 5, wherein said cellulosic pulp fibers have an alpha-cellulose purity greater than 90% by weight.

33. The composite of claim 5, wherein said cellulosic pulp fibers have an alpha-cellulose purity grater than 98% by weight.

34. The composite of claim 5, wherein said polymeric material comprises a thermoplastic.

35. The composite of claim 34, wherein said thermoplastic has a melting point greater than 180° C.

36. The composite of claim 34, wherein said thermoplastic has a melting point greater than 250° C.

37. The composite of claim 5, wherein said polymeric material comprises a polymer selected from the group consisting of polyamides (nylons), PET (polyethylene terephthalate), PBT (polybutylene terephthalate), PTT (polytrimethylene terephthalate) (e.g., Corterra by Shell), ECM (ethylene-carbon monoxide) (e.g. Carilon by Shell), SAN (styrene/acrylonitrile), SMA (stylene/maleic anhydride) or mixtures thereof.

38. The composite of claim 34, wherein said polymeric material comprises a thermoplastic having a melting temperature between 180–270° C.

39. The composite of claim 5, wherein said polymeric material comprises nylon.

40. The composite of claim 5, wherein said polymeric material comprises a thermoplastic selected from the group consisting of Nylon 6, Nylon 12, Nylon 66 or mixtures thereof.

41. The composite of claim 5, wherein said polymeric material has a density and a tensile strength (dry, unconditioned value), and said composite has a density less than 20% different and a tensile strength 20% greater than that of said polymeric material.

42. The composite of claim 5, wherein said polymeric material has a density and a tensile modulus (dry, unconditioned value), and said composite has a density less than 20% different from and a tensile modulus 80% greater than that of said polymeric material.

43. The composite of claim 5, wherein said polymeric material has a density and a flexual strength (dry, unconditioned value), and said composite has a density less than 20% different from and a flexual strength 45% greater than that of said polymeric material.

44. The composite of claim 5, wherein said polymeric material has a density and a notched Izod impact strength (dry, unconditioned value), and said composite has a density less than or equal to that of said polymeric material.

* * * * *